United States Patent [19]
Wallace et al.

[11] Patent Number: 6,004,379
[45] Date of Patent: Dec. 21, 1999

[54] SYSTEM FOR QUENCHING AND SCRUBBING HOT PARTIAL OXIDATION GAS

[75] Inventors: Paul S. Wallace, Katy; M. Kay Anderson, Missouri City; DeLome D. Fair, Friendswood, all of Tex.

[73] Assignee: Texaco Inc., White Plains, N.Y.

[21] Appl. No.: 09/092,711

[22] Filed: Jun. 5, 1998

Related U.S. Application Data

[60] Provisional application No. 60/048,783, Jun. 6, 1997.

[51] Int. Cl.$^6$ ............................. B01D 47/02; B01D 47/06
[52] U.S. Cl. ............................... 95/172; 95/192; 95/205; 95/226; 96/236; 96/279; 96/280; 96/330; 96/333; 96/351
[58] Field of Search .............................. 95/149, 205, 226, 95/172, 192, 208; 96/236, 239, 276, 278, 279, 280, 351, 330, 329, 333, 334, 269, 270, FOR 113, FOR 134, FOR 146, FOR 145, FOR 138

[56] References Cited

U.S. PATENT DOCUMENTS

| | | | |
|---|---|---|---|
| 803,139 | 10/1905 | Sinn et al. | 96/279 |
| 1,116,297 | 11/1914 | Koppers . | |
| 1,304,884 | 5/1919 | Kawai | 96/351 |
| 2,809,104 | 10/1957 | Strasser et al. | 48/215 |
| 2,992,906 | 7/1961 | Guptill | 48/196 |
| 3,473,903 | 10/1969 | Paull et al. | 48/212 |
| 3,544,291 | 12/1970 | Schlinger et al. | 48/206 |
| 3,545,926 | 12/1970 | Schlinger et al. | 23/213 |
| 3,607,157 | 9/1971 | Schlinger et al. | 48/206 |
| 3,681,897 | 8/1972 | Mitchell et al. | 55/227 |
| 3,930,812 | 1/1976 | Harris et al. | 48/197 R |
| 3,966,633 | 6/1976 | Friedman | 252/373 |
| 3,975,168 | 8/1976 | Gorbaty | 95/205 |
| 3,976,442 | 8/1976 | Paull et al. | 48/197 R |
| 3,976,443 | 8/1976 | Paull et al. | 48/197 R |
| 3,996,335 | 12/1976 | Wolk et al. | 423/210 |
| 4,001,116 | 1/1977 | Selcukoglu | 210/83 |
| 4,052,176 | 10/1977 | Child et al. | 55/32 |
| 4,071,322 | 1/1978 | Graat | 23/262 |
| 4,106,917 | 8/1978 | Fields et al. | 55/31 |
| 4,141,695 | 2/1979 | Marion et al. | 48/197 R |
| 4,141,696 | 2/1979 | Marion et al. | 48/197 R |
| 4,175,929 | 11/1979 | Frumerman et al. | 48/202 |
| 4,205,962 | 6/1980 | Marion et al. | 48/197 R |
| 4,205,963 | 6/1980 | Marion et al. | 48/197 R |
| 4,218,423 | 8/1980 | Robin et al. | 422/207 |
| 4,290,780 | 9/1981 | Dudt | 48/210 |
| 4,312,646 | 1/1982 | Fattinger et al. | 96/239 |
| 4,367,076 | 1/1983 | Peise et al. | 95/226 |
| 4,390,348 | 6/1983 | Dille et al. | 48/197 R |

(List continued on next page.)

FOREIGN PATENT DOCUMENTS

| | | |
|---|---|---|
| 0603997A2 | 6/1994 | European Pat. Off. . |
| 2166280 | 7/1973 | Germany . |
| 1244176 | 8/1971 | United Kingdom . |
| 2025453A | 1/1980 | United Kingdom . |
| 2125429 | 3/1984 | United Kingdom . |

*Primary Examiner*—Duane S. Smith
*Attorney, Agent, or Firm*—Henry H. Gibson; Arnold, White & Durkee

[57] ABSTRACT

A scrubbing tower and high pressure settler assembly, and the process for using same to remove particulates from a hot partial oxidation gas stream is disclosed. The scrubbing tower and high pressure settler assembly has a dip tube, a bottom portion, a top portion, and a high pressure settler. The dip tube transports partial oxidation gas from an injection point on the exterior of the scrubbing tower into a volume of water contained in the bottom portion of the scrubbing tower. A blowdown port capable of removing particulate matter is connected to the bottom portion of the assembly. A series of trays is provided in the top portion of the scrubbing tower. The top portion of the scrubbing tower also has inlet ports for receiving water and an outlet port for releasing the scrubbed partial oxidation gas. The use of the high pressure settler facilitates higher particulate settling rates as well as higher scrubbing efficiencies. Preferably, the high pressure settler exists as a sump internal to the scrubbing tower or a sump and quiet zone combination that is internal to the scrubbing tower.

16 Claims, 2 Drawing Sheets

U.S. PATENT DOCUMENTS

| | | | |
|---|---|---|---|
| 4,392,981 | 7/1983 | Corbeels et al. | 252/373 |
| 4,402,709 | 9/1983 | Stellaccio | 48/197 R |
| 4,402,710 | 9/1983 | Stellaccio | 48/197 R |
| 4,465,496 | 8/1984 | Suggitt | 48/197 R |
| 4,466,810 | 8/1984 | Dille et al. | 48/197 R |
| 4,470,830 | 9/1984 | Aubert | 95/226 |
| 4,472,171 | 9/1984 | Broderick | 48/62 R |
| 4,474,581 | 10/1984 | Dille et al. | 48/61 |
| 4,474,582 | 10/1984 | Dille et al. | 48/61 |
| 4,502,869 | 3/1985 | Jahnke et al. | 48/197 R |
| 4,553,981 | 11/1985 | Fuderer | 48/62 R |
| 4,559,061 | 12/1985 | Jahnke et al. | 48/63 |
| 4,588,418 | 5/1986 | Gabler et al. | 48/197 R |
| 4,597,773 | 7/1986 | Quintana et al. | 48/197 R |
| 4,704,137 | 11/1987 | Richter | 48/197 R |
| 4,705,542 | 11/1987 | Gilmer | 55/93 |
| 4,721,516 | 1/1988 | Barsacq | 55/218 |
| 4,722,745 | 2/1988 | Pike | 96/280 |
| 4,849,057 | 7/1989 | Steinstrasser et al. | 202/96 |
| 4,854,942 | 8/1989 | Denney et al. | 48/197 R |
| 4,861,558 | 8/1989 | Lehto | 96/351 |
| 4,863,489 | 9/1989 | Suggitt | 48/197 R |
| 4,986,966 | 1/1991 | Lehto | 422/168 |
| 5,201,919 | 4/1993 | Jahn et al. | 96/330 |
| 5,232,467 | 8/1993 | Child et al. | 48/127.3 |
| 5,251,433 | 10/1993 | Wallace | 60/39.05 |
| 5,345,756 | 9/1994 | Jahnke et al. | 60/39.02 |
| 5,415,673 | 5/1995 | Hilton | 48/252 |
| 5,711,770 | 1/1998 | Malina | 48/197 R |

SYSTEM FOR QUENCHING AND SCRUBBING HOT PARTIAL OXIDATION GAS

CROSS REFERENCE TO PATENTS

This application claims priority from provisional patent application Ser. No. 60/048,783 filed on Jun. 6, 1997, entitled "Gasifier Syngas Quenching and Scrubbing System."

FIELD OF THE INVENTION

This invention relates generally to a gasification process for producing partial oxidation gas and, more particularly, to an improvement in the process for treating the raw producer gas from the gasifier to effect the removal of particulate contaminants therefrom and the subsequent cooling of these gases to remove entrained water vapor and ammonia.

BACKGROUND AND SUMMARY OF THE INVENTION

The production of gas from the partial oxidation of hydrocarbonaceous fuels, especially coal in the form of anthracite, bituminous, lignite or peat, has been utilized for a considerable period of time and has recently undergone significant improvements due to the increased energy demand. In these methods, the hydrocarbonaceous fuels are reacted with a reactive oxygen-containing gas, such as air or oxygen, optionally in the presence of a temperature control moderator in a gasification zone to obtain the hot partial oxidation gas. In addition to coal, various other hydrocarbonaceous fuels are suitable as feedstocks for the gasification process.

The term "hydrocarbonaceous" as used herein to describe various suitable feedstocks is intended to include gaseous, liquid, and solid hydrocarbons, carbonaceous materials, and mixtures thereof. In fact, substantially any combustible carbon-containing organic material, or slurries thereof, may be included within the definition of the term "hydrocarbonaceous". For example, there are (1) pumpable slurries of solid carbonaceous fuels, such as particulate carbon dispersed in a vaporizable liquid carrier, such as water, liquid hydrocarbon fuel, and mixtures thereof; and (2) gas-liquid-solid dispersions, such as atomized liquid hydrocarbon fuel and particulate carbon dispersed in a temperature moderating gas.

The term "liquid hydrocarbon," as used herein to describe suitable liquid feedstocks, is intended to include various materials, such as liquefied petroleum gas, petroleum distillates and residua, gasoline, naphtha, kerosene, crude petroleum, asphalt, gas oil, residual oil, tar-sand oil and shale oil, coal derived oil, aromatic hydrocarbons (such as benzene, toluene, xylene fractions), coal tar, cycle gas oil from fluid-catalytic-cracking operations, furfural extract of coker gas oil, and mixtures thereof.

"Gaseous hydrocarbon fuels," as used herein to describe suitable gaseous feedstocks, include methane, ethane, propane, butane, pentane, natural gas, coke-oven gas, refinery gas, acetylene tail gas, ethylene off-gas, and mixtures thereof. Solid, gaseous, and liquid feeds may be mixed and used simultaneously; and these may include paraffinic, olefinic, acetylenic, naphthenic, and aromatic compounds in any proportion.

Also included within the definition of the term "hydrocarbonaceous" are oxygenated hydrocarbonaceous organic materials including carbohydrates, cellulosic materials, aldehydes, organic acids, alcohols, ketones, oxygenated fuel oil, waste liquids and by-products from chemical processes containing oxygenated hydrocarbonaceous organic materials, and mixtures thereof.

Depending upon its intended use, the partial oxidation gas produced in a gasification process may be referred to as synthesis gas, reducing gas, or fuel gas. The generic terms "partial oxidation gas" and "producer gas" will be used herein to collectively refer to all of these potentialities.

In a typical gasification process, a raw producer gas stream, substantially comprising $H_2$, CO, and at least one gas from the group $H_2O$, $CO_2$, $H_2S$, COS, $CH_4$, $NH_3$, $N_2$, Ar and often containing entrained solids, i.e., particulate carbon and ash, is produced by partial oxidation of a hydrocarbonaceous fuel with a free-oxygen containing gas, optionally in the presence of a temperature moderator, in the reaction zone of an unpacked free-flow noncatalytic partial-oxidation gas generator. The atomic ratio of free oxygen to carbon in the fuel (O/C ratio), will typically be in the range of about 0.6 to 1.6, and preferably about 0.8 to 1.4. The reaction time will typically be in the range of about 1 to 10 seconds, and preferably about 2 to 6 seconds. When steam is used as the temperature moderator the steam-to-fuel weight ratio in the reaction zone will typically be in the range of about 0.1 to 5, and preferably about 0.2 to 0.7.

The raw producer gas stream will typically exit from the reaction zone at a temperature in the range of about 1,300° to 3,000° F., and more typically in the range of about 2,000° to 2,800° F., and at a pressure typically in the range of about 1 to about 250 atmospheres, and more typically in the range of about 15 to about 150 atmospheres.

The typical gas generator comprises a vertical cylindrically shaped steel pressure vessel lined with refractory, such as disclosed in coassigned U.S. Pat. No. 2,809,104. Typically a quench drum for cooling the hot effluent stream of gas from the reaction zone to a temperature in the range of about 300° to 600° F. by direct contact with water will also be incorporated into the gas generator. This arrangement is also disclosed in U.S. Pat. No. 2,809,104. At least a portion of the entrained solids, i.e., particulate carbon and ash, are removed from the process gas stream by the turbulent quench water and a pumpable dispersion of particulate carbon and water containing about 0.1 to 4.0 wt. % particulate solids is produced in the quench tank incorporated into the gasification reactor. Any remaining entrained solids, water vapor, and unwanted gaseous contaminants are removed from the process gas stream in additional operations.

While the composition of the raw gas stream leaving the gas generator will vary depending upon, among other things, the type of hydrocarbonaceous fuel used and process conditions, a typical partial oxidation gas emerging from the gasification reactor will have the following mole percent compositions on a dry basis: $H_2O$ 6 to 29, CO 20 to 57, $CO_2$ 2 to 30, $CH_4$ nil to 25, $H_2S$ nil to 2, COS nil to 0.1, $NH_3$ nil to 0.1, $N_2$ nil to 60, and Ar nil to 0.5. Trace amounts of cyanides may also be present. Water will typically be present in the gas in the range of about 1 to 75 mole percent. Particulate carbon will typically be present in the range of about 0.5 to 20 weight percent (basis carbon content in the original feed). Ash and other particulate matter may also be present.

The hot partial oxidation gas which is withdrawn from the gasification zone and subjected to cleansing operations to rid it of various contaminants which are formed or liberated from the hydrocarbonaceous fuel during the gasification step. These contaminants can readily become environmental pollutants if not properly treated. For example, unwanted contaminants often found in the hot partial oxidation gas include water vapor, hydrogen sulfide, carbonyl sulfide, ammonia, cyanides, various halogens and particulates in the form of carbon, ash, and coal, as well as trace metals. The extent of the contaminants in the partial oxidation gas is often determined by the type of hydrocarbonaceous fuel, particularly when coal is employed, the particular gasification process utilized, as well as, the operating conditions. In any event, the disposal and control of these pollutants are major problems in the gasification processes which must be satisfactorily handled in order to make gasification a viable process without suffering attendant pollution problems.

Of the variety of methods employed to remove contaminants from the partial oxidation gas emerging from the gasifier, many involve the use of a scrubbing tower. In the typical scrubbing tower, producer gas emerging from the gasifier is bubbled through a volume of water contained in the tower. After the bubbling, an appreciable amount of the particulate contaminants remain in the water. These particulates initially form a dispersion in the water and over time and as the water cools settle to the bottom of the tower where they can be removed through a blowdown or other outlet port. The water will often also contain some trace metals and halogens. The water will likewise often contain very small levels of contaminants, like ammonia, hydrogen sulfides, carbonyl sulfides, and cyanides, that are at least somewhat soluble in the water. These levels, however, will be very small due to the temperature of the water and the process pressures. The procedure in which the partial oxidation gas is brought in contact with water to remove contaminants is referred to as "scrubbing."

The water used for the scrubbing operation becomes what is commonly known as "dirty water," since it is contaminated with particulates. This dirty water may be subjected to a variety of steps which may include the stripping of the water to remove the small amounts of hydrogen sulfide, carbonyl sulfide, and ammonia, and also solvent extraction to remove the small amounts of cyanides and the other inorganic anions, such as the halogens.

After bubbling, the partial oxidation gas emerges from the water. However, the gas emerging from the water is not substantially free of contaminants. Substantially all of the ammonia, hydrogen sulfide, carbonyl sulfide, and cyanides initially present in the gas stream entering the scrubber are still present in the gas emerging after bubbling from the water. Additionally, the emerging gas will contain a significant amount of water vapor. Of particular concern in the present invention is the presence of ammonia and water vapor. Among other problems that may occur if these contaminants are not substantially removed, the water can cause problems with a downstream flare if not removed in time and ammonia can interfere with process steps in which sulfur containing contaminants are removed.

Also present in the emerging gas are residual levels of particulate contaminants. As such, prior art processes have been designed to further reduce ammonia and particulate levels present in the gas after the initial bubbling.

In prior art processes, additional removal of particulates is often achieved by placing a series of vertically stacked and offset trays above the water in the scrubber. Water is provided to the top of these trays and is channeled to the bottom of the trays where it joins the volume of water contained in the scrubber bottom. As the emerging gas containing residual particulates comes in contact with the water, additional scrubbing occurs with the result being that the additional amounts of particulates are carried with the water to the bottom of the scrubber for subsequent removal.

The efficiency of this particulate removal process is directly related to the steam pressure in scrubber head space above the water. When the water temperature is high, the amount of steam, and therefore the steam pressure, in the overhead is also high. Conversely, when the water temperature is low, steam pressure and concomitantly scrubbing efficiency are also low.

From the foregoing, it would appear obvious that the solution to maintaining peak scrubbing efficiency in the overhead is to maintain the water temperatures as high as possible. Unfortunately, this solution is not without its own problems.

While increased scrubbing efficiency is directly related to increased water temperature, particulate settling rate is inversely related to water temperature. The consequences of these two adverse relationships is demonstrated as follows. The continuous addition of gas containing particulates to the scrubber dictates that at some point the particulates must be removed. Preferably, removal of contaminants is achieved without completely shutting down the scrubber. As previously disclosed, this is commonly achieved by means of a blowdown located at the bottom of the scrubber.

It should be evident that peak removal efficiency is achieved with higher settling rates. As the settling rate increases, the blowdown volume will increasingly be comprised primarily of particulates with the amount of water removed being reduced. Increased settling rates therefore have the additional benefit of reducing the amount of make-up water that must be added.

While increased settling rates are desirable, they, as disclosed, often can not be achieved in prior art processes without cooling the water in the scrubber. But as also disclosed, the cooling of the water detrimentally affects the scrubbing efficiency in the scrubber overhead.

Increased settling rates are also frustrated by turbulence. Producer gas entering the volume of water generates considerable turbulence and agitation. The scrubbing efficiency in the body of water is due in some part to this turbulence. However, the turbulence adversely affects the rate of settling for the particulates once they are separated from the gas.

In some prior art processes, the problem of turbulence and its effects on settling is remedied by the constant dumping of the bottoms of the scrubber to a low pressure settler. While this modification might solve the problem of turbulence and its effect on particulate settling, it, also, is not without its faults. In particular, this modification dictates that make-up water be added to the scrubbing tower at very high rates as the bottoms of the scrubber will contain a substantial portion of water. Additionally, some portion, albeit a very small portion, of the partial oxidation gas that has not had sufficient time to bubble to the surface of the water is also dumped. Such a modification is therefore inefficient because of the increased water requirements and the lower resulting yields of partial oxidation gas. As such, this and other modifications evident in the prior art have not been entirely acceptable.

It would therefore be desirable to discover a quenching and scrubbing system wherein separation and removal of the particulate contaminants generated during the gasification and entrained in the production gases is improved. In particular, it would be desirable to minimize the amount of makeup water that is necessary.

Another problem with prior art gasification processes relates to the removal of ammonia and cyanides, particularly ammonia as the concentration of ammonia typically greatly exceeds the cyanide concentration.

As disclosed, the partial oxidation gas exiting a scrubbing operation still contains substantially all of the ammonia, hydrogen sulfide, carbonyl sulfide, and cyanides initially present. It will also contain a considerable amount of water vapor. For almost all, if not all, of the intended uses of the partial oxidation gas, these contaminants must be removed. Removal of the water vapor, ammonia, and the cyanides, typically in the form of hydrogen cyanide, is advantageously achieved first as these contaminants will either condense at higher temperatures and pressures or dissolve in water at higher temperatures and pressures.

Typically, the hot partial oxidation gas exiting the scrubbing operation is passed through a series of heat exchangers and knockout drums or their equivalents to reduce the temperature of the gas stream, thereby effectuating the removal of water and ammonia as condensate. As disclosed, complete removal, or substantially complete removal, of water and ammonia is desired as the presence of these materials has an adverse effect on downstream operations, notable flaring and sulfur removal. As such, an inordinate number of heat exchangers and knockout drums, or their equivalents, have typically been used to help ensure complete removal of ammonia and water vapor. Unfortunately, undesirable levels of ammonia are often still present after these series of cooling and washing steps.

Therefore, it would be desirable to discover a cooling and washing system that more efficiently removed water vapor and ammonia from wet hot partial oxidation gas. In particular, a system that did not require an excessive number of heat exchangers and knockout drums, or their equivalents, would be desirable.

In accordance with one aspect of the invention, a scrubbing tower and high pressure settler assembly comprising a dip tube, a bottom portion, a top portion, and a high pressure settler is provided. The dip tube transports partial oxidation gas from an injection point on the exterior of the scrubbing tower into a volume of water contained in the bottom portion of the scrubbing tower. A blowdown port capable of removing particulate matter is connected to the bottom portion of the assembly. A series of trays is provided in the top portion of the scrubbing tower. The top portion of the scrubbing tower also has inlet ports for receiving water and an outlet port for releasing the scrubbed partial oxidation gas. The use of the high pressure settler facilitates higher particulate settling rates as well as higher scrubbing efficiencies.

In accordance with another aspect of the invention, a process for removing particulates from partial oxidation gas in a scrubbing tower and high pressure settler assembly is provided. The process comprises: bubbling partial oxidation gas containing particulates through water in the scrubbing tower under conditions sufficient to separate particulate matter from the partial oxidation gas; removing the separated particulates via a high pressure settler; passing the separated gas and any residual particulates through a series of trays; and providing water to the series of trays such that the gas emerging from the trays is substantially free of particulates; and recovering the gas emerging from the series of trays.

BRIEF DESCRIPTION OF THE DRAWINGS

A more complete understanding of the invention may be had by reference to the accompanying drawings which illustrate preferred embodiments of the invention.

DESCRIPTION OF ILLUSTRATIVE EMBODIMENTS

Figure 1:
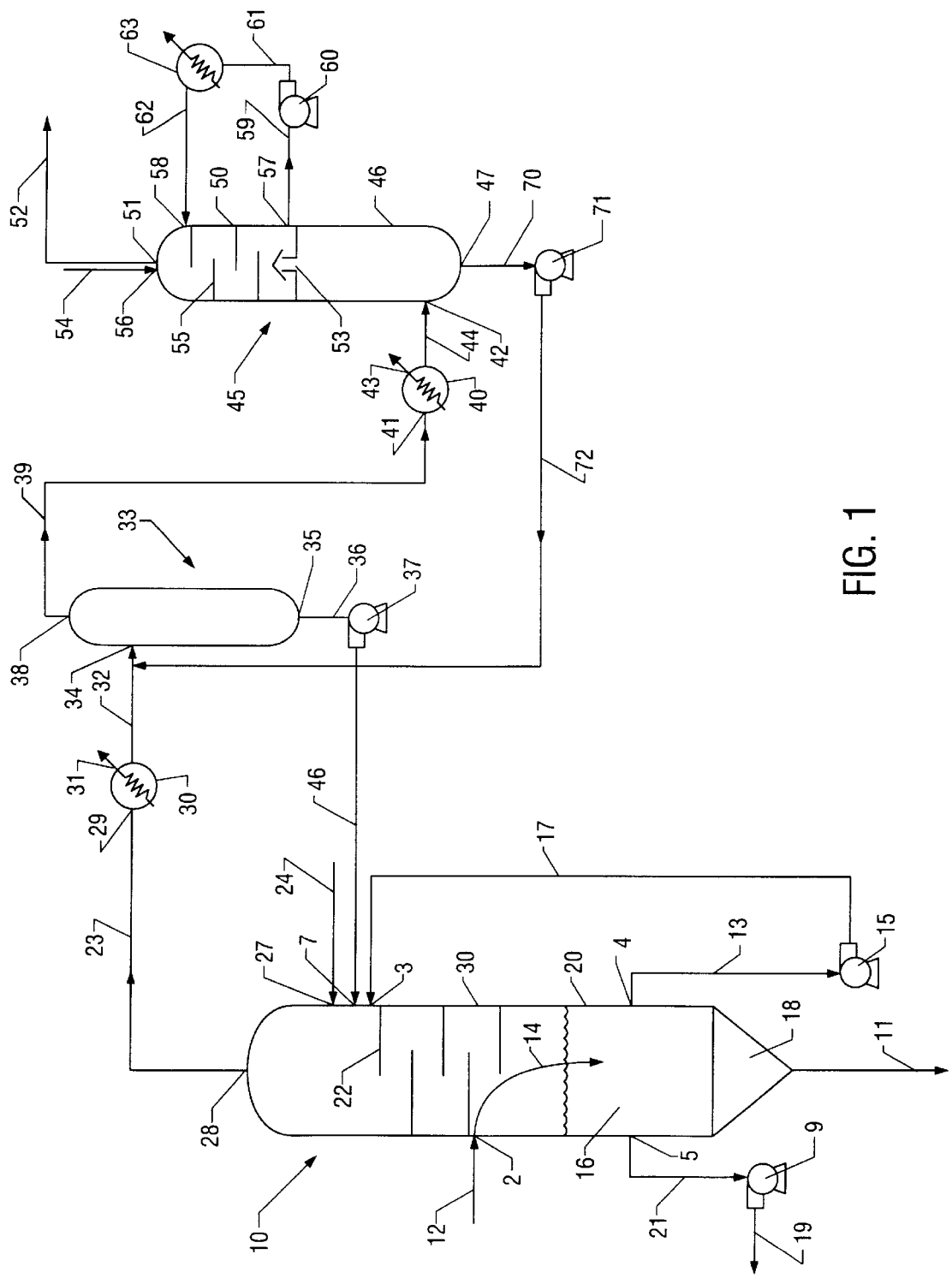
FIG. 1 depicts a partial schematic of a scrubbing tower and heat exchanger assembly for use in a gasification process.

In the subject process, a raw gas stream, substantially comprising $H_2$, CO, and at least one gas from the group $H_2O$, $CO_2$, $H_2S$, COS, $CH_4$, $NH_3$, $N_2$, Ar and containing entrained solids, such as particulate carbon and ash, having been produced by partial oxidation of a hydrocarbonaceous fuel with a free-oxygen containing gas, is subjected to quenching and scrubbing as well as cooling and washing operations in which particulate contaminates such as carbon and ash and condensable contaminants such as ammonia and water vapor are removed to produce a cooled partial oxidation gas that can be used as a synthesis, fuel, or reducing gas. The quenching and scrubbing and cooling and washing operations of the present invention provide increased efficiency over prior operations adapted for similar purposes. In the various embodiments of the present invention, increased efficiency is manifested in the removal of particulate contaminants from a scrubbing tower, the removal of condensable contaminants, particularly ammonia and water vapor, from the partial oxidation gas during the cooling and washing system, and reductions in the amount of makeup water that must be added throughout.

In one embodiment of the invention, hot partial oxidation gas withdrawn from the gasification reactor and laden with particulate contaminants, such as carbon and ash, as well as condensable contaminants, such as ammonia and water vapor, is introduced into a scrubbing tower 10 that is generally divided into a bottom portion 20 and top portion 30. Specifically, the gas is introduced into a volume of water 16 contained in the bottom portion 20. Preferably, the gas is introduced into the water 16 by means of a dip tube 14 that has one end immersed in the volume of water 16 and another end connected to an inlet port 2. The dip tube 14 can be constructed of any type of tubing, piping, or equivalent designed for the environment one of ordinary skill in the art would expect to be present. The inlet port 2 is similarly connected to a stream of hot partial oxidation gas 12 laden with contaminants. Preferably, this inlet port 2 is located on the upper portion 30. The end of the dip tube 14 immersed in the volume of water 16 can be at least partially surrounded by a baffle plate which advantageously controls turbulence.

By means of the dip tube 14, the producer gas is bubbled through the water 16. As a result of this bubbling, several things occur. First, carbon and ash particulate contaminants become trapped in the water. The producer gas having a reduced, but still measurable, level of particulate contaminants emerges from the water 16. These residual contaminants are removed overhead in a subsequent scrubbing that employs trays 22 and water. In addition to the residual particulates, the emerging gas will still contain substantially all of the initial quantities of the gaseous contaminants, notably ammonia, hydrogen sulfide, carbonyl sulfide, and cyanides. The emerging gas will also contain a substantial amount of water vapor.

The separated particulates initially form a dispersion in the water before settling to the bottom of the scrubbing tower 10. Unfortunately, particulate settling is impeded by a number of factors. The most notable factor is turbulence. The turbulence is primarily due to the injection of the producer gas into the volume of water 16 from the dip tube 14. In the present embodiment of the invention, a high pressure settler is used to negate the effects of the turbulence.

According to this embodiment, slow settling rates are remedied by maintaining the scrubber and any subsequent or integrated settler under the same high pressures evident in the gasification reactor. The benefits of such a high pressure settler system are best revealed when contrasted with one prior art method, previously described, in which the bottoms of the scrubbing tower are dumped to a separate, low pressure settler. Even when using a separate low pressure settler, some time must be allowed for initial settlement so that the dumped bottoms comprise primarily particulate matter and not a substantial volume of water. Unfortunately, settling of the particulate matter does not occur appreciably until the water 16 is cooled. However, as disclosed, cooling of the water 16 can detrimentally affect the overall particulate scrubbing efficiency.

In contrast, when a high pressure settler is used, settling of particulates at a desirable rate is achieved without artificial cooling of the water. Also, with increased settling rates, bottoms dumped to a separate high pressure settler do not contain as much water as bottoms that are similarly dumped to a separate low pressure settler. As such, there is a reduced need to add make-up water to the scrubber when the high pressure settler is used.

When a separate vessel is utilized as the high pressure settler it can be connected to the scrubbing tower 10 via a blowdown. FIG. 1, however, depicts a preferred embodiment, in which the high pressure settler is integrated internally to the scrubbing tower in the form of a sump 18. For the purposes of this invention, a sump should be understood to be a space located at the terminal end of the bottom portion 20 of the scrubbing tower 10. The sump 18 is positioned at a sufficient distance from the end of the dip tube 14 immersed in the water 16 so that turbulence experienced in the sump 18 is reduced over that experienced near the end of the dip tube 14 immersed in the water 16.

The shape of the sump 18 should be chosen so as to advantageously affect the rate of settling. Preferably the sump 18 is substantially cone shaped. Benefits of using an internal sump 18 rather that a separate vessel as the high pressure settler include reduced piping requirements and reduced pressure drop-off. Once the particulates have settled in the sump 18, they can be removed via blowdown 11.

Figure 2:
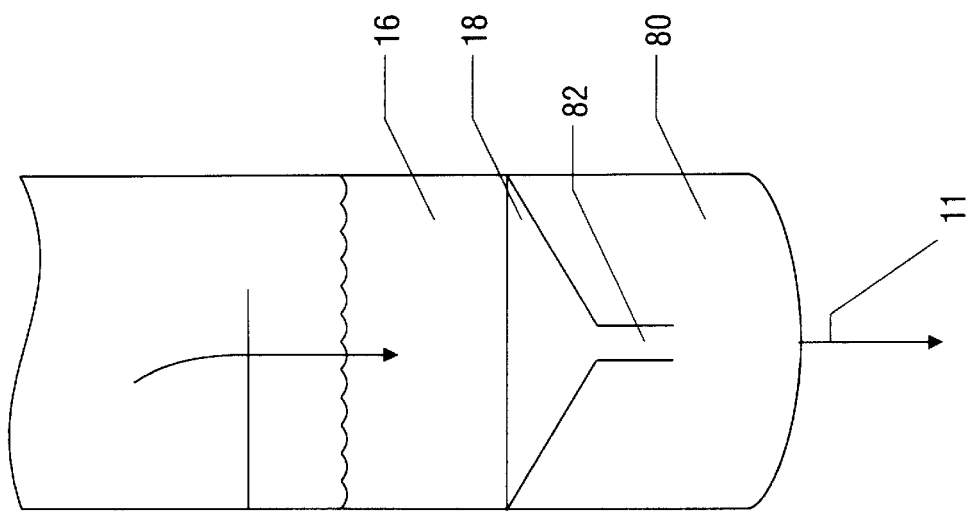
FIG. 2 depicts a preferred embodiment in which a quiet zone is utilized in conjunction with the sump of the scrubbing tower. While the invention is susceptible to various modifications and alternative forms, specific embodiments have been shown by way of example in drawings and will be described in detail herein. However, it should be understood that the invention is not intended to be limited to the particular forms disclosed. Rather, the invention is to cover all modifications, equivalents, and alternatives falling within the spirit and scope of the invention as defined in the appended claims.

Turbulence can be further minimized by positioning a baffle plate at the top of the sump 18. In other embodiments the effects of turbulence can be further reduced while maintaining the benefits of an internal high pressure settler by employing a quiet zone 80 as illustrated in FIG. 2. In accordance with this embodiment, a sump 18, preferably a substantially cone shaped sump, is modified to have a dip tube 82. When a substantially cone shaped sump is employed as preferred, the dip tube is preferably placed at what would have been the tip of the cone. Under the high pressures evident in the scrubbing tower 10, particulates are forced into the sump 18 and through the dip tube 82 and into the quiet zone 80. Here the particulates are allowed to settle further under the high pressures. After settling, removal of particulates can be achieved, as before, via a blowdown 11. As with the previously disclosed sump 18, the use of the quiet zone minimizes pressure drop and piping requirements.

In addition to increased settling and particulate removal rates, the use of a high pressure settler provides other benefits for the quenching and scrubbing operation. In particular, the use of a high pressure settler advantageously affects the scrubbing efficiency in the top portion 30 of the scrubbing tower 10. As disclosed, producer gas emerging from the water 16 still contains some particulates. To remove the residual particulates, the emerging gas is passed over a series of trays 22 located in the top portion 30 of the scrubbing tower 10. The trays are vertically stacked, and preferably offset, such that water introduced at the top tray is channeled to the bottom tray.

Water having substantially reduced, if not negligible, contaminant levels is introduced to the top portion 30 of the scrubbing tower 10 at the top of the trays 22 via inlet port 27 and conduit means 24. Conduit means as understood presently and elsewhere in this specification includes any system of piping, tubing, valves, and pumps capable of transporting fluids as disclosed and designed for the environment one of ordinary skill in the art would expect to be present.

The partial oxidation gas passing through the series of trays 22 comes into contact with water introduced at inlet port 27. As a result of this contact, the gas is scrubbed. Residual particulate contaminants are removed and pass with the water to the bottom portion 20 of the scrubbing tower 10 joining the volume of water 16.

The efficiency of particulate removal in the top portion 30 of the scrubbing tower 10 is directly related to the steam pressure overhead, which is directly related to the temperature of the water 16. With the disclosed high pressure settler, water temperatures can be maintained high without negatively impacting particulate settling rates. Thus, the high pressure settler allows for both increased particulate settling rates and increased overhead scrubbing efficiency.

In another embodiment, the use of a high pressure settler advantageously allows for further reductions in the need to add make-up water to the scrubbing tower. Particulate levels in the volume of water 16 are substantially lower in scrubbing systems in which a high pressure settler is used than in scrubbing systems in which a high pressure settler is not used. Because of this difference, water obtained from the volume of water 16 can be provided to the top of the trays 22, thereby minimizing the amount of new water than must be added to achieve scrubbing in the top portion 30 of the scrubber. This recycling of water can be achieved, for example, through the use of outlet port 4, conduit means 13, pump 15, conduit means 17, and inlet port 3.

In still other embodiments, water 16 can be recycled to the quench ring of the gasification reactor. This could be achieved, for example, through the use of outlet port 5, conduit means 21, pump 9, and conduit means 19. Outlet ports 4 and 5, or similar outlet ports, can also be used to remove water for disposal or reclamation.

By any of these embodiments, substantially particulate-free hot partial oxidation gas emerges from the trays 22 and is released from the scrubbing tower 10 at outlet port 28.

Other embodiments of the invention address the cooling of the hot partial oxidation gas released from the scrubbing tower 10. In particular, these embodiments address the removal of water vapor and ammonia from this gas. In these other embodiments of the present invention, a scrubbing operation, preferably as previously described, is coupled with a cooling and washing operation in which water vapor and ammonia are condensed and removed from the partial oxidation gas.

In these embodiments, the partial oxidation gas is passed through a system of heat exchangers in combination with two or less knockout drums. In certain embodiments, a single knockout drum is used. In other embodiments, two knockout drums are employed, with at least one heat exchanger preferably being positioned between the two knockout drums. Preferably, the heat exchangers and knockout drums are vertically stacked so as to advantageously employ gravity to achieve material transport.

In one embodiment in which two knockout drums are employed, one or more, and preferably one, heat exchanger is placed between the two knockout drums. Another heat exchanger precedes the first knockout drum. In accordance with this embodiment, hot partial oxidation gas emerging from the scrubber tower 10 is provided to the inlet port 29 of a first heat exchanger 30 via conduit means 23. Heat 31 is recovered and the condensate and partial oxidation gas, including ammonia and remaining water vapor, is provided to the inlet port 34 of the first knockout drum 33 via conduit means 32. Condensate is removed from the knockout drum via outlet port 35. Preferably, increased efficiency of the overall gasification process is achieved by recycling the water released from the first knockout drum 33 to previous process stages. For example, the condensate can be provided to the top of the trays 22 of the previously disclosed scrubbing tower 10. This can be done, as illustrated in FIG. 1, through the use of inlet port 7, conduit means 46, pump 37, and conduit means 36.

The partial oxidation gas, including any remaining ammonia and water vapor, is released from the first knockout drum 33 via outlet port 38. Conduit means 39 transports these fluids to the second heat exchanger 40. The fluids enter via inlet port 41. Heat 43 is recovered. The condensate and partial oxidation gas, including any residual ammonia and water vapor is then provided to the inlet port 42 of the second knockout drum 45 via conduit means 44.

The second knockout drum has an integral gas washing system consisting of trays and circulating water and is comprised of a bottom section 46 and top section 50. The inlet port 42 of the second knockout drum 45 is located in the bottom section 46. Condensate entering knockout drum 45 is removed via outlet port 47 located at the terminal end of the bottom section 46. Preferably, condensate from the second knockout drum 45 is provided to the inlet port 34 of the first knockout drum 33. This can be done as illustrated in FIG. 1 using conduit means 70, pump 71 and conduit means 72. This modification is advantageous in that the condensate helps to further cool the partial oxidation gas entering the first knockout drum 33. This modification also preheats the condensate entering the first knockout drum 33 before it is preferably returned to the scrubber or other earlier process stage.

The partial oxidation gas, including any residual ammonia and water vapor, passes from the bottom section 46 to the top section 50 via transfer means 53. Transfer means 53 is unidirectional such that gas or other fluids introduced to the top section 50 via the transfer means 53 or other inlet ports will not fall back to bottom section 46. Any type of tubing, piping, valves, or equivalents can be used as transfer means 21 as long as they provide unidirectional flow and are designed for the environment one of ordinary skill in the art would expect to be present. Preferably, transfer means 53 is a chimney tray.

The top section 50 is equipped with a series of vertically stacked and preferably offset trays 55 capable of channeling water from the top tray to the bottom tray. The top section 50 also has an inlet port 56 capable of receiving water via conduit means 54. Inlet port 56 is advantageously positioned so as to be capable of providing water to the top of the trays 55.

The partial oxidation gas rising through the top section 50 comes into contact with water being channeled through the trays. As a result, the gas is subjected to a final scrubbing. During this final scrubbing, substantially all, if not all, of the remaining water vapor and ammonia is removed. Partial oxidation gas is released from the second knockout drum at outlet port 51 and is recovered by conduit means 52.

This final water scrubbing operation is particularly adept at removing residual levels of ammonia. Carbon dioxide present in the partial oxidation gas dissolves in the water, rendering it slightly acidic. The slightly acidic water further increases the process' efficiency at removing the last traces of ammonia. From the foregoing, it can be understood that this final scrubbing conducted in the top section 50 of the second knockout drum 45 can be referred to as "acid scrubbing" due to the presence of CO. This is in contrast with the basic character of the ammonia-rich condensate collected in the bottom of this and the preceding knockout drum.

To maintain the acidic character of the top section 50, the water that collects at the lower end of the top section 50 is removed via outlet port 57. Advantageously, water removed via outlet port 57 is recycled to the top of the top section 50 at inlet port 58 using conduit means 59, pump 60, conduit means 61, and conduit means 62. When this recycle loop is employed, the water is preferably passed through a heat exchanger 63 to recover any heat and to cool the water. Because the water recycled to inlet port 58 has not been mixed with the ammonia rich condensate and because it has been cooled as a result of the heat exchanger, it is quite adept at removing residual ammonia. As ammonia levels in the water of the top section 50 become too high, the water can be removed from the top section by any traditional means, including a diverter valve in the recycle loop.

In other embodiments, a set of trays can also be positioned in the bottom section 46 of the second knockout drum 45. When this modification is employed, either fresh water or condensate taken from the bottom of the knockout drum can be provided to the top of the trays to facilitate scrubbing of the gas. However, use of fresh make-up water is preferred as the condensate will generally have too high of an ammonia content to be effective for scrubbing.

When two knockout drums are used, the first knockout drum 33 may also have an integral washing system as disclosed. The use of two knockout drums, both having integral washing systems, is however unnecessary as removal of ammonia and water vapor can be achieved as disclosed when only the second knockout drum has an integral washing system. In other embodiments only a single knockout is used. When this is the case, the lone knockout drum must have an integral washing system as disclosed to facilitate sufficient removal of the ammonia and water vapor. The use of this single knockout drum having a top, "acidic" section and a bottom, "basic" section and also having trays adapted to conducting a final scrubbing facilitates removal of the ammonia and water vapor from the partial oxidation gas. Obviously, however, condensate released from the single knockout drum is not provided to an earlier knockout drum as was the case in the preferred embodiment using two knockout drums. Instead, the condensate is preferably provided directly to prior process steps, such as the scrubber.

What is claimed is:

1. A scrubbing tower and high pressure settler assembly comprising: a dip tube, a bottom portion, a top portion, and a high pressure settler;

said dip tube being capable of transporting partial oxidation gas from an injection point on the exterior of the scrubbing tower into a volume of water contained in the bottom portion of the scrubbing tower;

said bottom portion comprising a blowdown port capable of removing particulate matter; and said top portion comprising one or more inlet ports capable of receiving water, an outlet port capable of releasing fluids, and a series of trays capable of channeling water from the top portion to the bottom portion.

2. The scrubbing tower and high pressure settler assembly of claim 1, wherein the high pressure settler comprises a vessel connected to the bottom portion of the scrubbing tower by means of the blowdown port.

3. The scrubbing tower and high pressure settler assembly of claim 1, wherein the high pressure settler comprises an internal sump positioned at the lower end of the bottom portion of the scrubbing tower.

4. The scrubbing tower and high pressure settler assembly of claim 3, wherein the sump is substantially cone shaped.

5. The scrubbing tower and high pressure settler assembly of claim 1, wherein the high pressure settler comprises an internal sump and quiet zone positioned at the lower end of the bottom portion of the scrubbing tower.

6. The scrubbing tower and high pressure settler assembly of claim 5, wherein the quiet zone is disposed below the internal sump and wherein a dip tube connects the quiet zone and the internal sump.

7. The scrubbing tower and high pressure settler assembly of claim 1, the bottom portion further comprising one or more outlet ports capable of releasing water.

8. The scrubbing tower and high pressure settler assembly of claim 7, further comprising a conduit capable of conveying water from an outlet port of the bottom portion capable of releasing water to an inlet port of the top portion capable of receiving water.

9. The scrubbing tower and high pressure settler assembly of claim 7, further comprising a conduit capable of conveying water from an outlet port of the bottom portion capable of releasing water to a gasification reactor.

10. A process for removing particulates from partial oxidation gas containing particulates comprising:

bubbling partial oxidation gas containing particulates through water under conditions sufficient to separate particulate matter from the partial oxidation gas; and removing the separated particulates via a high pressure settler.

11. The process of claim 10, further comprising:

passing the separated gas through a series of trays;

providing water to the series of trays such that the gas emerging from the trays is substantially free of particulates; and recovering the gas emerging from the series of trays.

12. The process of claim 10, wherein the process is carried out in a scrubbing tower and wherein the high pressure settler comprises a vessel separate from the scrubbing tower.

13. The process of claim 10, wherein the process is carried out in a scrubbing tower and wherein the high pressure settler is within the scrubbing tower and comprises a sump.

14. The process of claim 13, wherein the sump is substantially cone shaped.

15. The process of claim 10, wherein the process is carried out in a scrubbing tower and wherein the high pressure settler is within the scrubbing tower and comprises a sump and a quiet zone.

16. The process of claim 15, wherein the quiet zone is disposed below the sump and wherein a dip tube connects the quiet zone and the sump.

* * * * *